United States Patent [19]
Friedrich et al.

[11] Patent Number: 5,036,234
[45] Date of Patent: Jul. 30, 1991

[54] CONTROL CIRCUIT FOR TRIACS

[75] Inventors: Hornung Friedrich; Vogt Hans-Joachim, both of Stuttgart, Fed. Rep. of Germany

[73] Assignee: Robert Bosch GmbH, Stuttgart, Fed. Rep. of Germany

[21] Appl. No.: 392,993

[22] PCT Filed: Oct. 27, 1988

[86] PCT No.: PCT/DE88/00664
§ 371 Date: Jul. 24, 1989
§ 102(e) Date: Jul. 24, 1989

[87] PCT Pub. No.: WO89/05056
PCT Pub. Date: Jun. 1, 1989

[30] Foreign Application Priority Data
Nov. 23, 1987 [DE] Fed. Rep. of Germany ....... 3739623

[51] Int. Cl.$^5$ ................ H03K 17/292; H03K 17/725
[52] U.S. Cl. ..................................... 307/632; 307/262
[58] Field of Search ............... 307/632, 643, 648, 262

[56] References Cited
U.S. PATENT DOCUMENTS

| | | | |
|---|---|---|---|
| 3,676,706 | 7/1972 | Laupman | 307/632 |
| 3,840,800 | 10/1974 | Laupman | 307/632 |
| 4,321,480 | 3/1982 | Miles | 307/632 |
| 4,331,914 | 5/1982 | Huber | 307/632 |

FOREIGN PATENT DOCUMENTS
2403097 7/1975 Fed. Rep. of Germany .

Primary Examiner—John Zazworsky
Attorney, Agent, or Firm—Michael J. Striker

[57] ABSTRACT

A direct current voltage controlled triggering circuit for triacs connected via a consumer resistor to an alternating current supply voltage uses the controllable channel resistance of a field effect transistor to distribute loading current among a series connection of capacitors connected via a load resistor and the consumer resistor to the a.c. supply voltage. A connection point of the load resistor and a load capacitor in the series connection is connected via a diac to the gate electrode of the triac, and the remaining series connected capacitors have an approximately equal value to provide symmetrization of the current flow phase angle for the diac.

4 Claims, 1 Drawing Sheet

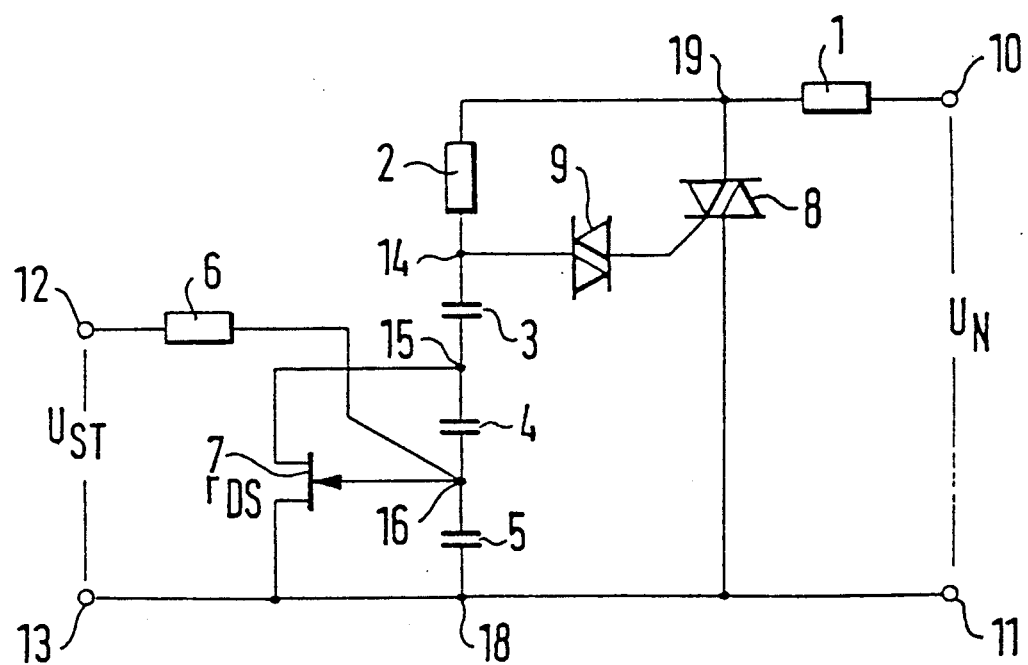

CONTROL CIRCUIT FOR TRIACS

BACKGROUND OF THE INVENTION

The invention deals with a direct current controlled trigger or control circuit for triacs connected via a consumer circuit to a source of alternating current supply voltage.

For power control of consumers of alternating current networks, triacs are used in increasing numbers. Traics provide in the simplest manner the full wave operation of the consumer with the phase cut off, since only a single control power element is required. At a predetermined angle of each half wave the triac must therefore be ignited.

A great number of circuits which produce ignition pulses suitable for ignition of triacs are known and require a different amount of structural elements. An arrangement for phase cut off control is disclosed in the DE-OS No. 24 03 097. With the known control circuit the current for loading a load capacitor is adjustable such that—in dependence upon the direct control current voltage—the resistance of the drain-source-channel ($r_{DS}$) of a field effect transistor is changeable. For coupling the half waves, two resistors are used in a bridge circuit with the field effect transistor, and serve for the symmetrization of the current flow angle of the positive and negative half waves.

A disadvantage of the known control circuits is the fact that relatively many structural elements are required which on the one hand increase the expenses and the space requirements and on the other hand increase the reliability risks.

ADVANTAGES OF THE INVENTION

The inventive circuit arrangement the advantage that the quantity of structural parts is considerably reduced and thereby the manufacturing expenses and the costs of the switching arrangement are lowered. Moreover, in advantageous manner junction layer-field effect-transistors (JFET) or insulating layer-field effect transistors (MOSFET) can be used, which are price favorable and operationally reliable.

It is especially advantageous when with MOSFET-transistors the gate is electrically isolated from the channel to provide the free selection of the potential between the control circuit and the switching circuit of the arrangement.

DRAWINGS

An embodiment example of the invention is shown in the drawings and illustrated in the following description.

DESCRIPTION OF THE EMBODIMENT EXAMPLE

A network alternating current voltage $U_N$ at the terminals 10 and 11 is applied via a consumer 1 to the load path of the triac 8. Parallel to this load path, there is connected a series circuit composed of the load resistor 2 and the capacitors 3, 4 and 5. The model points 18 and 19 form respectively the connecting points of the triac 8. The model point 14 which lies between the load resistor 2 and the load capacitor 3 is connected via the diac 9 with the gate of the triac 8. Furthermore the model point 15 lying between the capacitors 3 and 4 is connected with one end of the drain-source channel of a field effect transistor 7, while the other end of the channel is connected with the model point 18. The gate of the field effect transistor 7 is connected with the model point 16, which is formed by the joint connection of the capacitors 4 and 5. Simultaneously the direct current control voltage $U_{ST}$ is supplied via resistor 6 from the terminal 12 to the model point 16. The control voltage $U_{ST}$ is supplied at the terminals 12 and 13.

The operation of the circuit arrangement is described below.

In the blocking phase of the triac 8, in other words at the beginning of each half wave of the network voltage $U_N$, the load capacitor 3 is loaded via the load resistor 2 and via the combination of the series connected capacitors 4 and 5 the channel of the field effect transistor 7. When the sum of the voltages of the capacitors 3, 4 and 5 reaches the breakdown voltage of the diac 9, then the diac abruptly becomes conductive and supplies an ignition pulse to the gate of the triac 8. The triggered triac 8 remains conductive till the half wave of the network voltage again reaches zero. The capacitors 3, 4, and 5 are also almost completely discharged through the diac 9, the load resistor 2 and the triac 8. At the beginning of the next network half wave, at which the triac 8 again switches on from the blocking phase, the process is repeated with reverse polarity, so that ignition pulses of alternating polarity are applied to the triac half-periodically.

The current flow angle of the triac is determined by the time which the series connected capacitors between points 14 to 18 require for reaching the breakdown voltage of the diac 9. The loading time of the capacitor chain is influenced by the channel resistor $r_{DS}$ of the field effect transistor 7. The loading current itself is equal in each half wave, since it is determined only by the load resistor 2. The adjustable channel resistance $r_{DS}$ provides different distributions of the load current for load capacitor 3 on the one hand, and the capacitors 4 and 5 on the other hand. At a low ohmic channel resistance $r_{DS}$ the largest part of the load current flows through the drain source path of the field effect transistor to the loading capacitor 3; the capacitors 4 and 5 are almost inactive. The breakdown voltage of the diac 9 is reached at a later time point, so that a smaller current flow angle is obtained. If the channel resistance $r_{DS}$ is high ohmic, there results a smaller capacity value due to the series connection of the capacitors 3, 4 and 5. The breakdown voltage of the diac 9 is reached at an earlier time point, so that a greater current flow angle is produced. With suitable dimensioning of the capacitors 3, 4 and 5 approximately the whole angular range of between 0° and 180° of the current flow is covered. The capacity of the load capacitor 3 is set considerably greater than those of the capacitors 4 and 5. The adjustment of the channel resistance $r_{DS}$ is performed by the direct current control voltage $U_{ST}$, which is supplied through the series resistor 6 to the gate of the field effect transistor 7. The capacitors 4 and 5 are required for the symmetrization of the gate-channel voltage of the field effect transistors 7. Thereby it is achieved that the alternating polarity of the drain-source voltage during the positive and negative half waves produces equal channel resistance $r_{DS}$. An n-channel-field effect transistor being controlled with a negative control voltage $U_{ST}$, is illustrated in this example. The utilization of a P-channel-field effect transistor supplied with a positive control voltage $U_{ST}$ is also possible. In the inventive circuit arrangement field effect-transistors can be utilized, whose gate is either not isolated from the channel (for example JFET) or is isolated from the channel (for example MOSFET).

The circuit arrangement is especially advantageously suitable for incorporation in electrically operating hand tools, since they can be manufactured in a price favorable manner and with small structural shape.

We claim:

1. A direct current voltage controlled triggering circuit for a triac which in series with a power consumer is connected to a source of alternating current supply voltage ($U_N$), comprising a source of direct current control voltage ($U_{ST}$); a field effect transistor; a series connection of a load resistor, a load capacitor, and two additional capacitors, said series connection being connected via said power consumer to said source of alternating current supply voltage ($U_N$); a connection point of said load resistor and said load capacitor being connected via a biac to the control electrode of said triac; the drain-source channel of said field effect transistor being connected in parallel with said series connected two additional capacitors; and a connection point of said two additional capacitors being connected to the gate of said field effect transistor and to a terminal of said source of direct current control voltage ($U_{ST}$).

2. A triggering circuit as defined in claim 1, wherein said field effect transistor is selected from the group consisting of a junction-layer field effect transistor (JFET) and insulating layer field effect transistor (MOSFET).

3. A triggering circuit as defined in claim 1, wherein said load capacitor has a substantially larger capacity than that of the series connected two additional capacitors.

4. A triggering circuit as defined in claim 1, wherein said two additional capacitors have a substantialy equal capacity.

* * * * *